J. H. BETTELEY.
CAR-STARTER.

No. 184,357.                        Patented Nov. 14, 1876.

UNITED STATES PATENT OFFICE.

JOSEPH H. BETTELEY, OF LONDON, ENGLAND.

IMPROVEMENT IN CAR-STARTERS.

Specification forming part of Letters Patent No. 184,357, dated November 14, 1876; application filed March 26, 1874.

*To all whom it may concern:*

Be it known that I, JOSEPH HENRY BETTELEY, of the city of London, England, have invented a new and Improved Mode of Stopping and Starting Tramway-Cars, of which the following is a specification:

This invention consists in adapting to an ordinary tramway-car an arrangement by means of which the car may be stopped with facility, and the power exerted in stopping the same be stored up for the purpose of starting the car.

Figure 2:
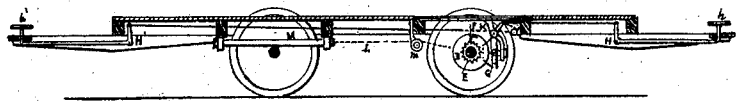
Figure 1:
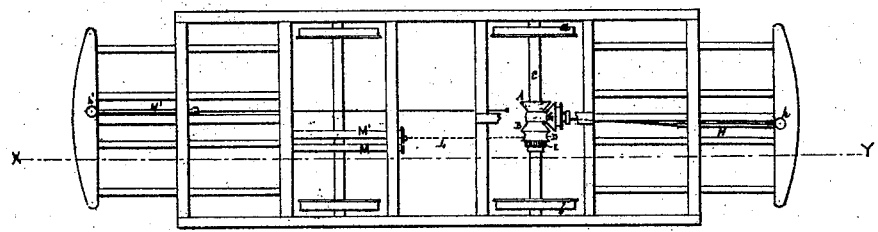

In the drawings, Figure 1 is a plan view of the frame-work of a car with my improvement attached, and Fig. 2 a sectional view of the same on line $x\ y$.

Similar letters of reference indicate corresponding parts in both figures.

A and B are two conical friction or beveled cog-wheels, one of which, A, is keyed on the axle C. The other, B, is loose on this axle. D is a pulley fixed to the loose wheel B. E is a cog-wheel keyed on the axle C. F is a double pawl, the fulcrum of which is on the pulley D. G is a third conical friction or tooth wheel, which may be brought into contact with the two wheels A and B by means of the treadles $h\ h'$, levers H H', and chain K. L is a chain, one end of which is attached to the pulley D, and the other, passing over a sheave, $m$, is made fast to india-rubber, air, or metallic springs M M'.

The operation of my invention is as follows: The car being in motion, and it being desired to stop the same, the driver presses down upon one of the treadles—$h$, for example. This pressure will be communicated, by the lever H, to the wheel G, which will be brought into contact with the two wheels A and B. The wheel A, being keyed on the axle C, communicates its motion to the wheel B by the wheel G, and the wheel B will turn in a contrary direction to the wheel A, and carrying with it the pulley D, round which the chain L will coil, thereby expanding the springs M M'. Meanwhile the pawl F acts on the cog-wheel E as a brake, and stops the car. The pawl F is made double in order that it may be tripped to act on the wheel E, to adapt it to cars that are drawn from either end in either way.

The power or momentum of the car at the time of stopping will be stored up in the spring, which will exert a forward pressure upon the wheels, which will be nearly sufficient to move the car, and will materially lessen the pull of the horses in starting. After the car has been put in motion, the wheel G is thrown out of gear with the wheels A and B, until it is again necessary to stop the car.

What I claim is—

The combination of the lever H and cog-wheel G, actuated thereby, and the cog-wheel A, keyed to the shaft C, with the cog-wheel B, pulley D and its pawl, cog-wheel E on the shaft C, the chain L, and the spring M, (one or more,) substantially as herein described.

J. H. BETTELEY.

Witnesses:
   JAMES LEDGER,
   W. H. BURRELL,
     *Both of 5 Southampton Buildings,*
         *Holborn, London, W. C.*